United States Patent [19]

Lyons

[11] 3,938,465

[45] Feb. 17, 1976

[54] SIGNAL DEVICE

[76] Inventor: John H. Lyons, 351 Rancho, Ridgecrest, Calif. 93555

[22] Filed: Mar. 26, 1974

[21] Appl. No.: 454,876

[52] U.S. Cl. ............... 116/63 P; 40/125 H; 40/134; 116/114 R; 240/2.25
[51] Int. Cl.² ...................... E01F 9/00; F21V 9/16
[58] Field of Search ........ 116/63 R, 63 P; 240/2.25; 248/44, 46, 160, 102; 40/125 H, 125 N, 134

[56] References Cited
UNITED STATES PATENTS

| | | | |
|---|---|---|---|
| 1,863,756 | 6/1932 | Lufkin | 116/63 P X |
| 2,033,296 | 3/1936 | Porter | 248/102 |
| 2,767,497 | 10/1956 | Munson | 116/63 P |
| 2,790,410 | 4/1957 | Wald, Jr. | 116/63 R |
| 3,105,457 | 10/1963 | Krueger | 116/63 P |
| 3,119,588 | 1/1964 | Keats | 40/135 N X |
| 3,239,406 | 3/1966 | Coffman et al. | 116/114 AM |
| 3,292,569 | 12/1966 | Trigilio | 116/63 P |
| 3,455,156 | 7/1969 | Kelly | 116/63 P X |
| 3,819,925 | 6/1974 | Richter et al. | 240/2.25 |

FOREIGN PATENTS OR APPLICATIONS

| | | | |
|---|---|---|---|
| 1,167,085 | 10/1969 | United Kingdom | 116/63 P |

*Primary Examiner*—Richard C. Queisser
*Assistant Examiner*—Daniel M. Yasich
*Attorney, Agent, or Firm*—R. S. Sciascia; Roy Miller; Gerald F. Baker

[57] ABSTRACT

A signal device combining a fluorescent or phosphorescent light tube and a slip on holder and which is designed to be thrown or dropped from a vehicle as a warning marker. The light tube is preferably of the chemically actuated type and the holder preferably has four resilient appendages serving to ensure that the device will assume an angular position of about 45° when dropped.

5 Claims, 6 Drawing Figures

U.S. Patent  Feb 17, 1976  3,938,465
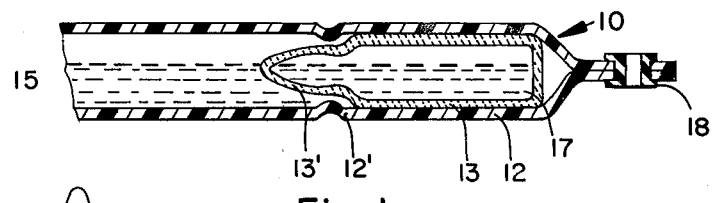
Fig. 1
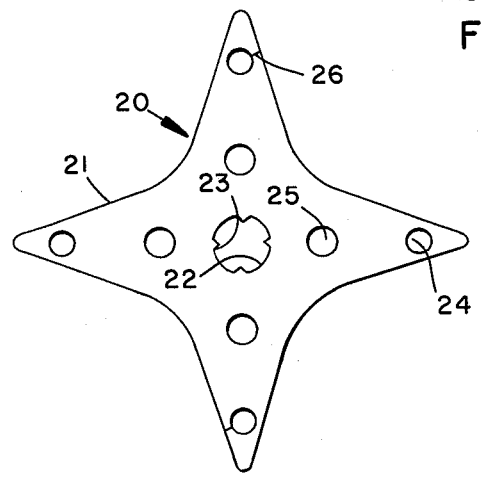
Fig. 2
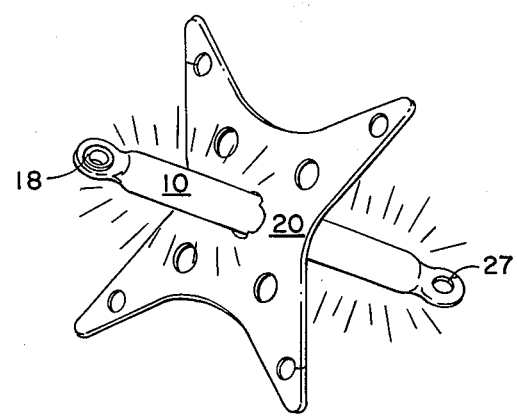
Fig. 3
Fig. 4
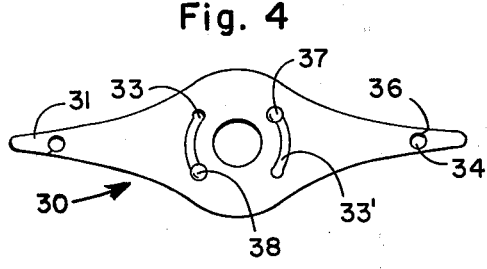
Fig. 5
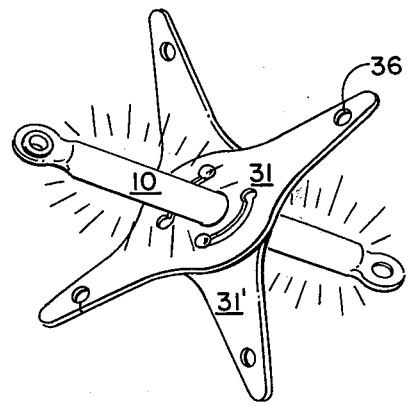
Fig. 6

SIGNAL DEVICE

GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

Reference is made to Assignees' prior U.S. Pat. No. 3,784,796 and co-pending application Ser. No. 340,434 filed Mar. 12, 1973, Now U.S. Pat. No. 3,819,925 each disclosing chemical lighting devices usable with the Signal Device of the present invention.

Reference is also made to Assignees' co-pending applications Ser. Nos. 454,877 and 454,878 filed of even date which disclose similar signal devices.

BACKGROUND OF THE INVENTION

Many kinds of emergency flares, flags, reflectors and the like have been devised and used, for example, to warn approaching motorists that a disabled vehicle is present along a highway. All of the known devices, however, take considerable time to deploy, many are fire hazards, and most are susceptible to the destruction of their effectiveness when struck or run over by passing vehicles.

On high speed highways, vehicles carrying flammable material are particularly hazardous when disabled without warning. It has often happened that the disabled vehicle has been struck before flares could be carried a safe distance from the vehicle and lighted or set up. Tragedies caused by these circumstances prompted the search for a signal device which could be easily and quickly deployed and which would be effective under all weather conditions day or night.

According to the present invention a device is provided which may be dropped or thrown from a vehicle or otherwise placed on the roadway without the necessity for taking time to "set up" the device. When used with a chemically actuated light tube, for instance, the signal device may be easily seen at great distances, is fire proof, and is not easily rendered ineffective by being struck or run over by passing vehicles.

BRIEF DESCRIPTION OF THE DRAWINGS

FIG. 1 is a longitudinal sectional view of a typical chemical illuminating device useable in carrying out the present invention;

FIG. 2 is a plan view of one embodiment of a holder useable in carrying out the invention;

FIG. 3 is an assembled view in perspective of the device of FIG. 2 in use;

FIG. 4 is a plan view of a holder capable of being folded for storage;

FIG. 5 is a side elevation of the holder of FIG. 4;

FIG. 6 is a perspective view of the second embodiment of the invention.

DESCRIPTION AND OPERATION

Shown in FIG. 1 generally designated by numeral 10 is a chemical lighting device having an outer cylindrical tube 12 of translucent material and containing a frangible ampoule 13 positioned inside the tube. The ampoule 13 is maintained in position by an indentation 12' in tube 12.

Tube 12 is made of a durable non breakable material such as clear radiation-crosslinked polyolefinic plastic tubing. The ends of the tube are flattened and sealed by application of heat and the flattened ends may be pierced and the opening fitted with a grommet 18. The ampoule 13 contains an activator material and is preferably made of glass which may be easily broken to effect mixing with the chemiluminescent material 15 which substantially fills the remainder of the tube 12. The lighting device may also be of the type disclosed in assignee's prior U.S. Pat. No. 3,764,796 referenced above. The chemical lighting device of the prior patent contains two ampoules. In other words, one ampoule contains a chemiluminescent material and the other ampoule contains an activator material. Since these chemical lighting devices are the inventions of others, applicants make no claim to invention of these devices per se.

Chemiluminescent materials usable as reactants in the light tube might be an oxalate ester such as bis(2,4,5-trichloro-6-carbopentoxyphenyl)oxalate, and a fluorescer such as 9,10 bis (phenylethynyl)anthracene.

A first embodiment of the slip-on holder for a roadside signal according to the present invention, is shown in FIG. 2 wherein the holder is generally designated by numeral 20. The holder consists of a plastic sheet 21 having a central opening 22 which is contoured to receive the light tube 12.

Opening 22 may be of any configuration effective to receive a light tube 12 with sufficient friction to maintain the parts assembled. In FIG. 2 the opening is shown with a plurality of tabs 23 protruding into the otherwise circular opening. The holder 20 may be of any shape from circular to polygonal and may be of opaque, translucent or transparent material. The embodiment shown in FIG. 2 is cut from a square of translucent light-enchancing plastic about a quarter of an inch thick and is formed with a number of holes 25 around the center and holes 24 near the edges. At least two of the holes 24 are cut as shown at 26 to facilitate linking together two or more units. At least one end of light tube 10 may be provided with means for joining as shown at 27 in FIG. 3. A second embodiment is illustrated in FIGS. 4, 5 and 6 showing a holder 30 comprising two substantially identical sections 31, 31' formed with slots 33, 33'. The sections are fastened together through the slots by means of pins or rivets 37, 38 for limited relative turning movement to achieve the configuration shown in FIG. 6. Slots 33, 33' may be eccentric and the central openings may be non-circular to provide for gripping of the inserted light tube 10. Holes 34 may be provided near the ends of each section and may be slit for attachment purposes as shown at 36. Other means for attaching a plurality of holders or light tubes together is limited only by the imagination of the user.

The mating portions of the two sections 31, 31' may be provided with frictional surfaces such as serrations to maintain the sections in place when deployed.

The assembled devices are shown in FIGS. 3 and 6 in typical positions when deployed. Assuming that the ampoule or ampoules have been broken before assembly, the signaling device when thrown or placed on the roadway will give off light for the life of the chemical mixture. The holders are designed to maintain the light tube in an angular position on the roadway even when thrown or dropped from a moving vehicle.

Although the holders have been illustrated in combination with a particular chemical light member, it is obvious that any visual augmentation device of a similar size and shape could be used with the base member herein described.

What is claimed is:

1. For use as a signal device to be deployed upon a supporting surface, the combination comprising:
   an elongated light member comprising a plastic tube containing chemiluminescent material means;
   support means comprising at least one configured piece of resilient plastic sheet material, at least one edge portion of said plastic sheet material cooperating with said plastic tube to maintain said tube at approximately a 45° angle to the surface upon which it is deployed;
   said plastic tube being relatively compressible and said support means having a non-circular central opening fitting on said tube with sufficient friction to maintain said tube and said holder assembed with the holder intermediate the ends of said tube and orthogonal to the longitudinal axis thereof.

2. The device of claim 1 wherein the support means is a configured sheet of light enhancing translucent plastic material about one quarter inch thick.

3. For use as a signal device to be deployed upon a supporting surface, the combination comprising:
   an elongated light member comprising a plastic tube containing luminescent material means;
   support means formed of translucent sheet material and having at least one edge portion cooperating with said plastic tube to maintain said tube at approximately a 45° angle to the surface upon which it is deployed;
   said plastic tube being relatively compressible;
   said support means comprising two elongated segments of light enhancing translucent material centrally perforated with non-circular openings fitting on said tube with sufficient friction to maintain said tube and said holder assembled with the holder intermediate the end of said tube and orthogonal to the longitudinal exis thereof; and said segments being pivotally fastened so that when said segments are relatively rotated 90° with respect to each other a four pronged support configuration is achieved.

4. A traffic signal marker comprising in combination;
   an elongated tubular light member comprising a plastic tube containing chemiluminescent material means; and
   a support member;
   said support member comprising a slip on holder frictionally engaging said tube intermediate the ends and orthogonal to the longitudinal axis thereof and wherein said support member is formed of two elongated segments frictionally and pivotally assembled intermediate the ends thereof so that when said segments are relatively rotated 90°, a four pronged configuration is achieved whereby at least one edge portion of said elongated segments cooperate with said tubular light member in maintaining the signal marker in position.

5. The combination of claim 4 wherein said support consists of a configured sheet of light enhancing translucent plastic material.

* * * * *